(12) United States Patent
Oami et al.

(10) Patent No.: US 11,134,226 B2
(45) Date of Patent: *Sep. 28, 2021

(54) SURVEILLANCE SYSTEM, SURVEILLANCE METHOD, AND PROGRAM

(71) Applicant: NEC CORPORATION, Tokyo (JP)

(72) Inventors: Ryoma Oami, Tokyo (JP); Katsuhiko Takahashi, Tokyo (JP); Yuusuke Konishi, Tokyo (JP); Hiroo Ikeda, Tokyo (JP); Junko Nakagawa, Tokyo (JP); Kosuke Yoshimi, Tokyo (JP); Yukie Ebiyama, Tokyo (JP); Ryo Kawai, Tokyo (JP); Takuya Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/352,258

(22) Filed: Mar. 13, 2019

(65) Prior Publication Data

US 2019/0215493 A1 Jul. 11, 2019

Related U.S. Application Data

(63) Continuation of application No. 15/754,378, filed as application No. PCT/JP2016/073886 on Aug. 16, 2016.

(30) Foreign Application Priority Data

Sep. 2, 2015 (JP) .................................. 2015-173122

(51) Int. Cl.
*H04N 7/18* (2006.01)
*G08B 25/10* (2006.01)
(Continued)

(52) U.S. Cl.
CPC ....... *H04N 7/185* (2013.01); *G06Q 10/06311* (2013.01); *G08B 21/22* (2013.01);
(Continued)

(58) Field of Classification Search
CPC .. G06Q 10/06311; G08B 25/04; G08B 25/10; H04M 11/00; H04N 7/185; Y04S 10/54
See application file for complete search history.

(56) References Cited

U.S. PATENT DOCUMENTS 5,335,180 A 8/1994 Takahashi et al.
2003/0107648 A1 6/2003 Stewart et al.
(Continued)

FOREIGN PATENT DOCUMENTS

JP 2002-183380 A 6/2002
JP 2003-151055 A 5/2003
(Continued)

OTHER PUBLICATIONS

International Search Report for PCT/JP2016/073886 dated Nov. 8, 2016 [PCT/ISA/210].

(Continued)

*Primary Examiner* — Dakshesh D Parikh
(74) *Attorney, Agent, or Firm* — Sughrue Mion, PLLC

(57) ABSTRACT

A surveillance system (1) includes an area information acquisition unit (101), a position information acquisition unit (102), a candidate determination unit (103), and a notification unit (104). The area information acquisition unit (101) acquires information of a surveillance-desired area. The position information acquisition unit (102) acquires pieces of position information of a plurality of portable terminals (20), each portable terminal performing surveillance using an image capturing unit. The candidate determination unit (103) determines a candidate portable terminal (20) to be moved to the surveillance-desired area from (Continued)

among the plurality of portable terminals (20) based on the acquired pieces of position information of the plurality of portable terminals (20). The notification unit (104) outputs a notification to the candidate portable terminal requesting to move to the surveillance-desired area.

12 Claims, 10 Drawing Sheets

(51) Int. Cl.
*H04M 11/00* (2006.01)
*G08B 21/22* (2006.01)
*G06Q 10/06* (2012.01)
*G08B 25/04* (2006.01)

(52) U.S. Cl.
CPC ............. *G08B 25/04* (2013.01); *G08B 25/10* (2013.01); *H04M 11/00* (2013.01)

(56) References Cited

U.S. PATENT DOCUMENTS

| | | |
|---|---|---|
| 2004/0039504 A1 | 2/2004 | Coffee et al. |
| 2006/0048286 A1 | 3/2006 | Donato |
| 2009/0324010 A1 | 12/2009 | Hou |
| 2010/0085431 A1 | 4/2010 | Trapani |
| 2011/0231316 A1 | 9/2011 | Carroll, III |
| 2014/0132772 A1 | 5/2014 | Billau et al. |
| 2014/0172477 A1* | 6/2014 | Goulart ............ G06Q 10/06311 705/7.13 |
| 2014/0214499 A1 | 7/2014 | Hudson |
| 2014/0333775 A1 | 11/2014 | Naikal et al. |
| 2014/0358419 A1 | 12/2014 | Inagaki |
| 2014/0375800 A1 | 12/2014 | Lim et al. |
| 2015/0078618 A1 | 3/2015 | Kim |
| 2015/0365246 A1* | 12/2015 | Kane .................... H04L 51/046 709/203 |
| 2016/0044279 A1 | 2/2016 | Block et al. |
| 2016/0212504 A1 | 7/2016 | Meng et al. |
| 2016/0300463 A1 | 10/2016 | Mahar et al. |
| 2016/0329053 A1 | 11/2016 | Grahm et al. |
| 2016/0365885 A1 | 12/2016 | Honjo et al. |
| 2016/0366327 A1 | 12/2016 | Kusens |
| 2017/0140457 A1 | 5/2017 | Kaku et al. |

FOREIGN PATENT DOCUMENTS

| | | |
|---|---|---|
| JP | 2003-264821 A | 9/2003 |
| JP | 2003-284139 A | 10/2003 |
| JP | 2004-015336 A | 1/2004 |
| JP | 2005-136921 A | 5/2005 |
| JP | 2005-197811 A | 7/2005 |
| JP | 2005-197812 A | 7/2005 |
| JP | 2005-208858 A | 8/2005 |
| JP | 2005-252757 A | 9/2005 |
| JP | 2007-110642 A | 4/2007 |
| JP | 2008-65796 A | 3/2008 |
| JP | 2008-123366 A | 5/2008 |
| JP | 2008-311844 A | 12/2008 |
| JP | 2009-92423 A | 4/2009 |
| JP | 2010-271924 A | 12/2010 |
| JP | 2010-278962 A | 12/2010 |
| JP | 2012-104022 A | 5/2012 |
| JP | 2012-234449 A | 11/2012 |
| JP | 2013-179465 A | 9/2013 |
| JP | 2013-258532 A | 12/2013 |
| JP | 2014-107831 A | 6/2014 |
| JP | 2014-235602 A | 12/2014 |
| JP | 2015-46842 A | 3/2015 |
| JP | 2015-095695 A | 5/2015 |
| WO | 2012/096166 A1 | 7/2012 |

OTHER PUBLICATIONS

Communication dated Jun. 27, 2019 from the United States Patent and Trademark Office in U.S. Appl. No. 15/754,378.
Communication dated Nov. 19, 2019 by the United States Patent and Trademark Office in U.S. Appl. No. 15/754,378.
Communication dated Jun. 10, 2020 by the United States Patent and Trademark Office in U.S. Appl. No. 15/754,378.
Communication dated Apr. 28, 2020, issued by the Japan Patent Office in application No. 2017-537716.
Office Action for U.S. Appl. No. 16/352,186 dated Mar. 24, 2020.
Office Action dated Aug. 11, 2020 in Japanese Application No. 2017-537717.
Notice of Allowance dated Sep. 3, 2020 in U.S. Appl. No. 16/352,186.
Communication dated May 12, 2020, from the Japanese Patent Office in application No. 2017-537717.
International Search Report for PCT/JP2016/073887 dated Nov. 8, 2016 [PCT/ISA/210].
Office Action dated Aug. 24, 2020 in U.S. Appl. No. 16/352,429.
Office Action dated Jun. 12, 2020 in U.S. Appl. No. 15/754,622.
Kiwi-W Consortium, Car Navigation System-Kokaigata Data Kozo KIWI to sono Riyo Hoho-, 1st edition Kyoritsu Shuppan Co., Ltd., Feb. 25, 2003, pp. 96-97.
Office Action dated Jul. 1, 2020 in U.S. Appl. No. 16/352,340.
Office Action dated May 1, 2020 in U.S. Appl. No. 16/352,429.
Japanese Office Action for JP Application No. 2020-147302 dated May 11, 2021 with English Translation.

* cited by examiner

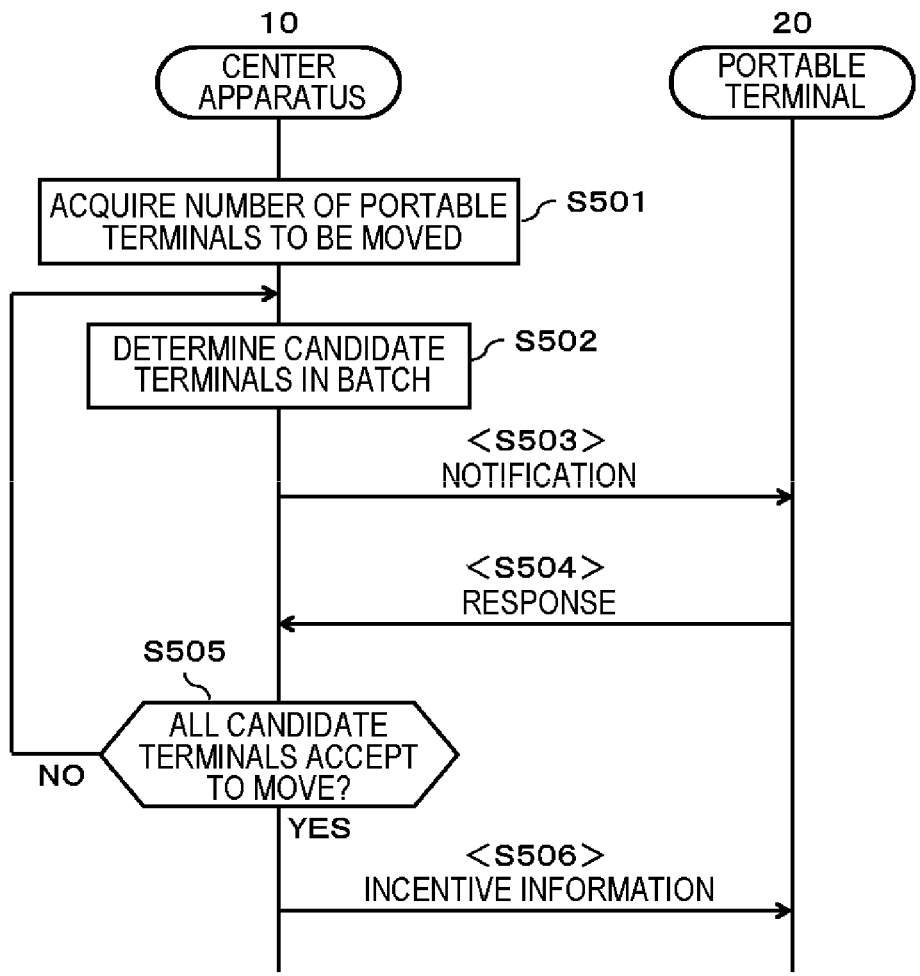

SURVEILLANCE SYSTEM, SURVEILLANCE METHOD, AND PROGRAM

CROSS REFERENCE TO RELATED APPLICATION

This application is a continuation of U.S. patent application Ser. No. 15/754,378, filed on Feb. 22, 2018, which is a National Stage of International Application No. PCT/JP2016/073886 filed on Aug. 16, 2016, which claims priority from Japanese Patent Application No. 2015-173122, filed Sep. 2, 2015, the contents of all of which are incorporated herein by reference in their entirety.

TECHNICAL FIELD

The present invention relates to a surveillance system that surveils a predetermined area.

BACKGROUND ART

In places where many people gather such as event venues, surveillance systems are required for detecting or preventing some sort of abnormality.

Patent Document 1 below is an example of a technology relating to such a surveillance system. Disclosed in Patent Document 1 is a technology for performing surveillance using images captured by a simple wearable camera or the like worn by a security guard.

RELATED DOCUMENT

Patent Document

[Patent Document 1] Japanese Patent Application Publication No. 2013-258532

SUMMARY OF THE INVENTION

Technical Problem

However, for example, in a large-scale event, the number of security guards is insufficient in comparison to the number of people gathered, thus possibly generating a poorly-surveilled area. A technology is thus desired for preventing an occurrence of a poorly-surveilled area by controlling placement of persons performing surveillance work in a surveillance area in accordance with the situation.

An object of the present invention is to provide a technology of controlling placement of persons performing surveillance work in a surveillance area in accordance with the situation.

Solution to Problem

According to the present invention, there is provided a surveillance system which includes:

an area information acquisition unit that acquires information of a surveillance-desired area;

a position information acquisition unit that acquires pieces of position information of a plurality of portable terminals, each terminal performing surveillance using an image capturing unit;

a candidate determination unit that determines a candidate portable terminal to be moved to the surveillance-desired area from among the plurality of portable terminals based on the acquired pieces of position information of the plurality of portable terminals; and a notification output unit that outputs a notification to the candidate portable terminal requesting to move to the surveillance-desired area.

According to the present invention, there is provided a surveillance method performed by a computer, the method including:

acquiring information of a surveillance-desired area;

acquiring pieces of position information of a plurality of portable terminals, each portable terminal performing surveillance using an image capturing unit;

determining a candidate portable terminal to be moved to the surveillance-desired area from among the plurality of portable terminals based on the acquired pieces of position information of the plurality of portable terminals; and outputting a notification to the candidate portable terminal requesting to move to the surveillance-desired area.

According to the present invention, there is provided a program causing a computer to function as:

an area information acquisition unit that acquires information of a surveillance-desired area;

a position information acquisition unit that acquires pieces of position information of a plurality of portable terminals, each portable terminal performing surveillance using an image capturing unit;

a candidate determination unit that determines a candidate portable terminal to be moved to the surveillance-desired area from among the plurality of portable terminals based on the acquired pieces of position information of the plurality of portable terminals; and a notification output unit that outputs a notification to the candidate portable terminal requesting to move to the surveillance-desired area.

Advantageous Effects of Invention

According to the present invention, it is possible to prevent an occurrence of a poorly-surveilled area.

BRIEF DESCRIPTION OF THE DRAWINGS

The above-described objects and other objects, features, and advantages are clarified more by the preferred example embodiment (which will be described below) and the following accompanying drawings.

FIG. 10 is a sequence diagram illustrating a flow of processing of a surveillance system in a second operation example of the fourth example embodiment.

DESCRIPTION OF EMBODIMENTS

Hereinafter, example embodiments of the present invention will be described with reference to the drawings. In all the drawings, the same components are denoted by the same reference signs and descriptions thereof will not be repeated.

First Example Embodiment

[System Configuration]

Figure 1:
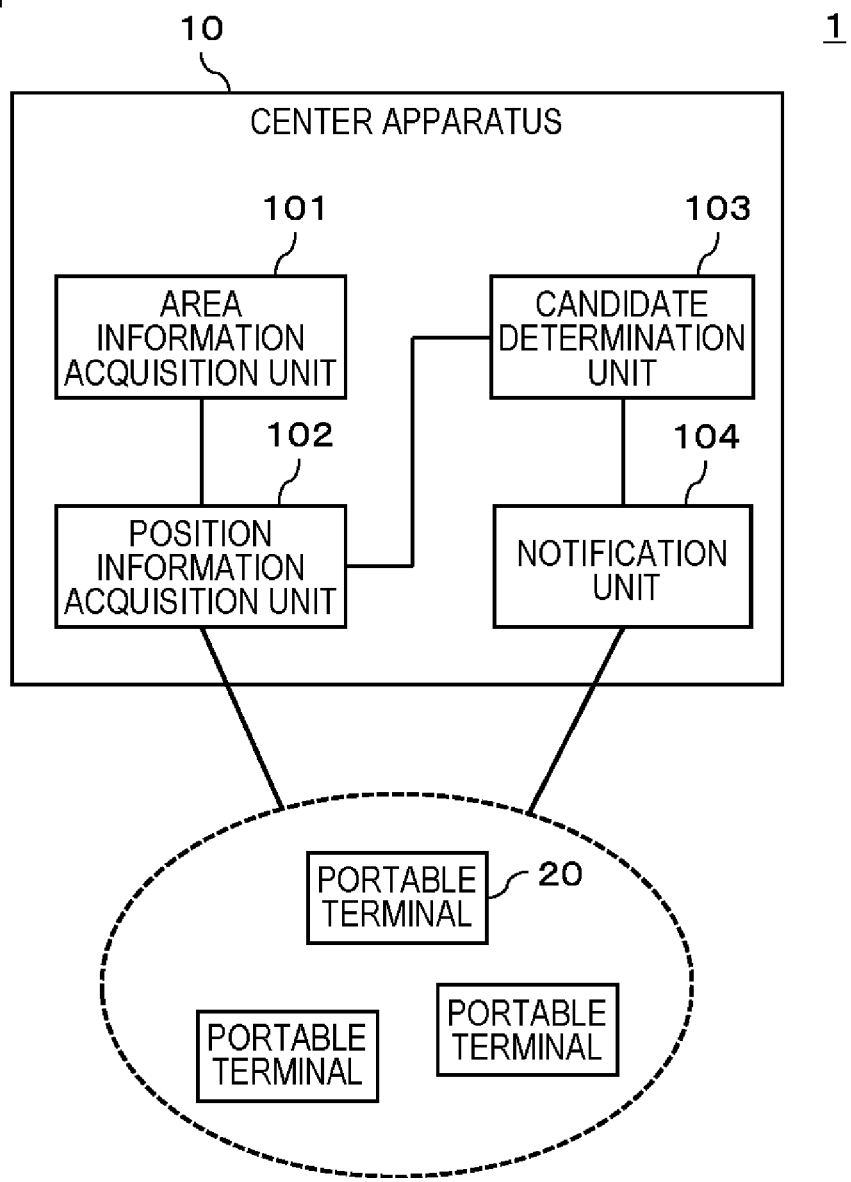
FIG. 1 is a diagram conceptually illustrating a system configuration of a surveillance system according to a first example embodiment.

FIG. 1 is a diagram conceptually illustrating a system configuration of a surveillance system 1 according to a first example embodiment. As illustrated in FIG. 1, the surveillance system 1 includes a center apparatus 10 and a plurality of portable terminals 20. The center apparatus 10 is not limited to the configuration in FIG. 1, and a plurality of center apparatuses 10 may be provided.

The center apparatus 10 performs surveillance work using pieces of information which are collected from a surveillance device (not illustrated) (for example, a fixed-point surveillance camera provided on a wall, a ceiling, or the like, or a mobile surveillance camera held by a security guard) connected through a network or the like. For example, the center apparatus 10 may be a stationary personal computer (PC) which is equipped in a building (in a surveillance center) or in a moving object such as a vehicle. The center apparatus 10 may be a portable terminal such as a smart phone or a tablet terminal.

The portable terminal 20 is a terminal held by a surveilling person in a place to be surveilled. Here, the "surveilling person" is not limited to, for example, security guards dispatched from, for example, security companies and the like performing surveillance work, and also includes ordinary persons visiting an event held in a place to be surveilled who have expressed participation to perform surveillance work. Expression of the participation in surveillance work is, for example, performed by the center apparatus 10 notifying each portable terminal 20 of a participation request in surveillance work, and the portable terminal 20 transmitting a notification indicating participation in surveillance as a response to the center apparatus 10. The portable terminal 20 is not particularly limited so long as the terminal includes an image capturing unit that captures an image (motion image or still image) of the surroundings and can transmit the captured image through a network. Specific examples of the portable terminal 20 include smart phones, tablet terminals, mobile telephones, and wearable cameras.

[Processing Configuration]

As illustrated in FIG. 1, the center apparatus 10 in this example embodiment includes an area information acquisition unit 101, a position information acquisition unit 102, a candidate determination unit 103, and a notification unit 104.

The area information acquisition unit 101 acquires information of a surveillance-desired area. The "surveillance-desired area" means an area which is desirably enhanced in surveillance and is at least a portion of the entire area (the area to be surveilled) surveilled by the surveillance system 1 according to the present invention. For example, the surveillance-desired area is determined by a surveillance operator, based on various kinds of information collected by the center apparatus 10. The determined surveillance-desired area is inputted to the center apparatus 10. Alternatively, the center apparatus 10 may automatically determine the surveillance-desired area based on various kinds of collected information.

Figure 2:
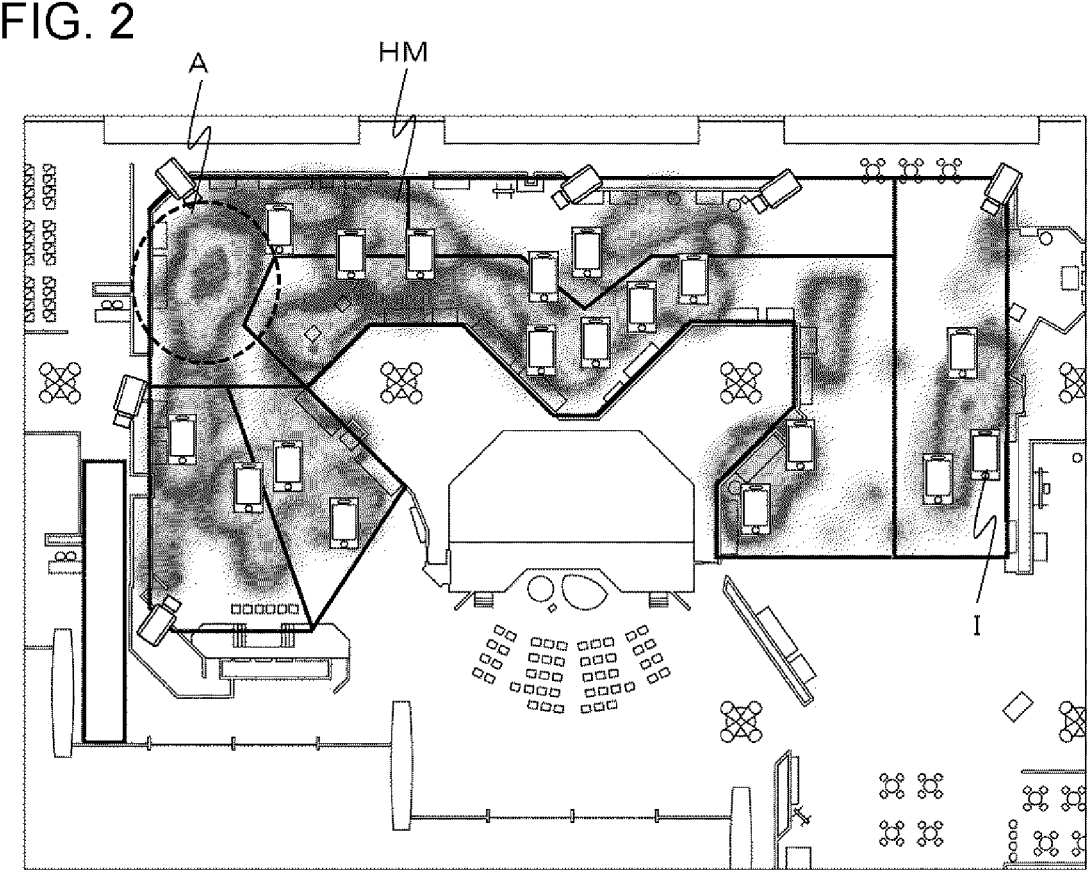
FIG. 2 is a diagram illustrating an example of a map displayed in a display of a center apparatus.

For example, as illustrated in FIG. 2, the area information acquisition unit 101 receives an input of the surveillance-desired area from the surveillance operator through a map of a place to be surveilled displayed on a display unit of the center apparatus 10. FIG. 2 is a diagram illustrating an example of the map displayed in a display of the center apparatus 10. The map may display, in a superimposed manner, for example, an icon I indicating position information of a portable terminal 20, a heat map HM (a map indicating the distribution of the degree of congestion), and the like which are generated using an analysis result of an image captured by a fixed-point surveillance camera or a portable terminal 20 as material for determining the surveillance-desired area. In the example in FIG. 2, for example, a surveillance operator can determine an area A surrounded by a dotted line as an area that should be enhanced in surveillance, since the number of portable terminals 20 is small in comparison to the degree of congestion. The area information acquisition unit 101 acquires an area overlapped by a figure drawn on the map by the surveillance operator as the surveillance-desired area. The surveillance operator draws the figure, for example, by using an input device such as a mouse or a touch panel. In a case where the map of the place to be surveilled is previously divided into a plurality of areas, the area information acquisition unit 101 can also acquire an area selected by the surveillance operator from among the plurality of areas using the input device as the surveillance-desired area.

In addition, without being limited to the above, the area information acquisition unit 101 may automatically discriminate an area to be enhanced in surveillance using various kinds of information which are collected for the surveillance work and acquire the specified area as a surveillance-desired area. The area information acquisition unit 101 can discriminate the surveillance-desired area based on, for example, distribution of the degree of congestion calculated by analyzing an image captured by a fixed-point surveillance camera or a portable terminal 20, distribution of pieces of position information of portable terminals 20 carried by surveilling persons, or the like.

The position information acquisition unit 102 acquires pieces of position information of a plurality of portable terminals 20, each terminal 20 performing surveillance using an image capturing unit. The position information acquisition unit 102 acquires, for example, position information of the portable terminals 20 from the global positioning system (GPS). The position information acquisition unit 102 may acquire, without being limited to the above, position information and the like of an access point of wireless fidelity (Wi-Fi) (registered trademark) provided in the neighborhood of the portable terminals 20, from the portable terminals 20. The position information acquisition unit 102 may identify position information of the portable terminals 20 based on the acquired position information of the access point. The position information acquisition unit 102 may be configured to acquire position information of each of the portable terminals 20 using, for example, a technology referred to as SmaPhoSensor (registered trademark) that detects the presence of portable terminals 20 nearby. SmaPhoSensor (registered trademark) can detect a frame in a wireless LAN transmitted by each smart phone and recognize which smart phone is present nearby.

The candidate determination unit 103 determines a candidate portable terminal 20 (also called a candidate terminal hereinbelow) to be moved to the surveillance-desired area from among the plurality of portable terminals 20, based on the acquired pieces of position information of the plurality of portable terminals 20. For example, the candidate determination unit 103 calculates the distribution of the portable terminals 20 from the acquired pieces of position information, and identifies an area in which the density of portable terminals 20 is equal to or greater than a predetermined value. The candidate determination unit 103 determines a number of candidate terminals from the portable terminals 20 present in the identified area. For example, the candidate determination unit 103 receives an input specifying the number of candidate terminals from a surveillance operator, and determines the candidate terminals of the specified number in a random order or in an order of proximity to the surveillance-desired area. The candidate determination unit 103 may determine the number of candidate terminals based on a function prepared in advance for calculating the number of portable terminals 20 to be moved, regardless of the input from the surveillance operator.

The notification unit 104 outputs a notification to the candidate terminals prompting to move to the surveillance-desired area using a notification message, an e-mail, or the like through a predetermined application.

[Hardware Configuration]

Figure 3:
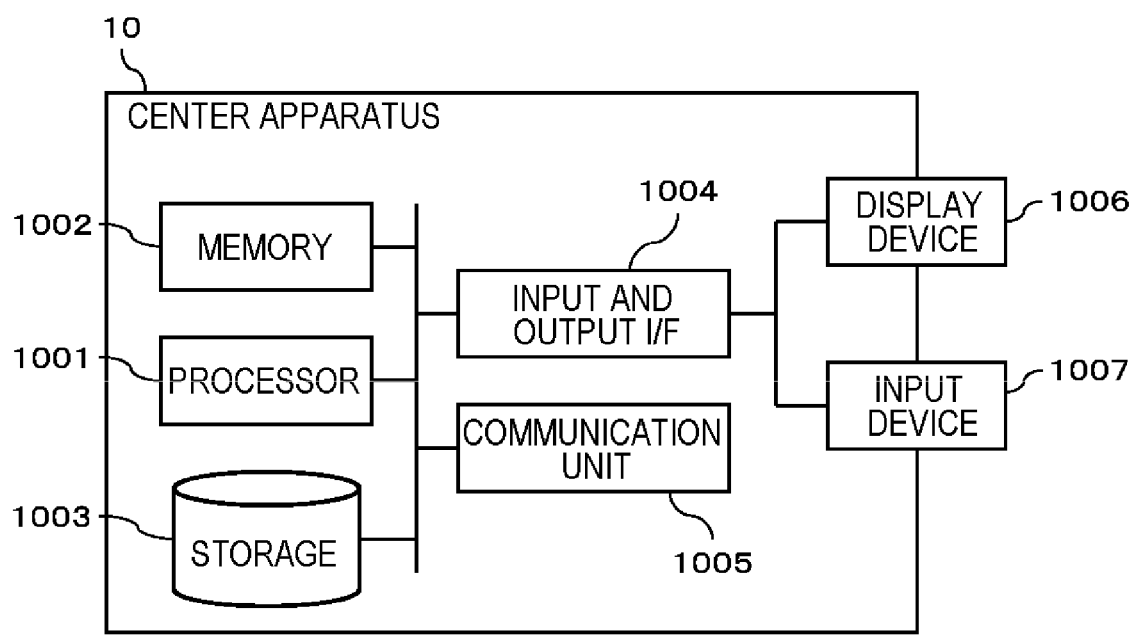
FIG. 3 is a diagram conceptually illustrating a hardware configuration of a center apparatus in the first example embodiment.

FIG. 3 is a diagram conceptually illustrating a hardware configuration of the center apparatus 10 in the first example embodiment.

The center apparatus 10 includes a processor 1001, a memory 1002, a storage 1003, an input and output interface (input and output I/F) 1004, a communication unit 1005, and the like. The processor 1001, the memory 1002, the storage 1003, the input and output interface 1004, and the communication unit 1005 are connected to each other by a data transmission path for mutually transmitting and receiving data.

The processor 1001 is, for example, an arithmetic processing unit such as a central processing unit (CPU) or a graphic processing unit (GPU). The memory 1002 is, for example, a memory such as a random access memory (RAM) or a read only memory (ROM). The storage 1003 is, for example, a storage device such as a hard disk drive (HDD), a solid state drive (SSD), or a memory card. The storage 1003 may be a memory such as a RAM or a ROM.

The storage 1003 stores programs for implementing functions of the processing units (area information acquisition unit 101, position information acquisition unit 102, candidate determination unit 103, notification unit 104, and the like) equipped in the center apparatus 10. The processor 1001 implements each of the functions of the processing units by executing the programs. Here, when the processor 1001 executes the programs, the processor 1001 may execute the programs after the programs are read on the memory 1002 or may execute the programs without reading the programs on the memory 1002.

The input and output interface 1004 is connected to a display device 1006, an input device 1007, and the like. The display device 1006 is a device such as a liquid crystal display (LCD) or a cathode ray tube (CRT), which displays a screen corresponding to drawing data processed by the processor 1001. The input device 1007 is a device that receives an operation input of an operator and is, for example, a keyboard, a mouse, a touch sensor, and the like. The display device 1006 and the input device 1007 may be integrated with each other, and thus may be implemented as a touch panel.

The communication unit 1005 transmits and receives data to and from the portable terminal 20 or other external devices. For example, the communication unit 1005 communicates with the portable terminal 20 or other external devices through a wired network or a wireless network.

Note that, the hardware configuration of the center apparatus 10 is not limited to the configuration illustrated in FIG. 3.

Operation Example

Figure 4:
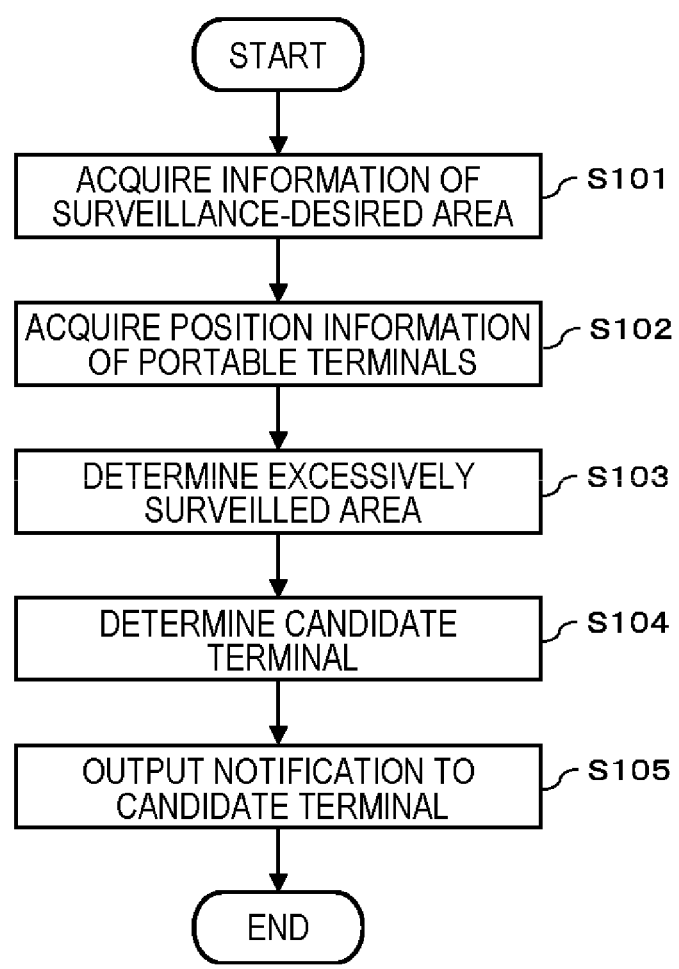
FIG. 4 is a flowchart illustrating a flow of processing of the surveillance system in the first example embodiment.

An operation example of the surveillance system 1 in this example embodiment will be described with reference to FIG. 4. FIG. 4 is a flowchart illustrating a flow of processing of the surveillance system 1 in the first example embodiment.

First, the area information acquisition unit 101 acquires information of a surveillance-desired area (S101). For example, the area information acquisition unit 101 acquires an area specified by an operation of a surveillance operator on the map illustrated in FIG. 2, or an area which has been automatically discriminated based on the distribution of the degree of congestion and the like, as information indicating the surveillance-desired area. The position information acquisition unit 102 acquires position information of each of the portable terminals 20 (S102). The candidate determination unit 103 identifies an area in which the number of portable terminals 20 is large (excessively-surveilled area) using the position information of each of the portable terminals 20 acquired in S102 (S103). Thereafter, the candidate determination unit 103 determines a number of candidate portable terminals 20 from among the portable terminals 20 present in the identified area to be moved to the surveillance-desired area indicated by the information acquired in S101 (S104). The notification unit 104 outputs a notification to the identified candidate, prompting to move to the surveillance-desired area indicated by the information acquired in S101 (S105).

Advantageous Effect of First Example Embodiment

As described above, in this example embodiment, an area with a large number of portable terminals 20 is identified from pieces of position information of the portable terminals 20, and a notification is outputted to the portable terminals 20 present in the determined area prompting to move to the surveillance-desired area where surveillance should be enhanced. Thus, it is possible to move security guards from a sufficiently-surveilled area to a poorly-surveilled area, and thus to thoroughly surveil the whole area.

Second Example Embodiment

In this example embodiment, the first example embodiment will be more specifically described.

[Processing Configuration]

A center apparatus 10 in this example embodiment has a processing configuration similar to that in the first example embodiment.

A candidate determination unit 103 in this example embodiment identifies a dense area of the portable terminals 20 based on position information of the portable terminals 20 acquired by a position information acquisition unit 102. The dense area is an area where a number of the portable terminals 20 or a density of the portable terminals 20 is equal to or greater than a predetermined first threshold. The candidate determination unit 103 determines a candidate portable terminal 20 to be moved to the surveillance-desired area identified by the area information acquisition unit 101 from among the portable terminals 20 present in the identified dense area.

For example, the first threshold is obtained by the candidate determination unit 103 using a function defining an upper limit of the number of portable terminals 20 (the number of portable terminals 20 considered as an excessively-surveilled state) per unit area. The candidate determination unit 103 calculates, for example, the number (density) of portable terminals 20 per unit area, each area having a predetermined size. The candidate transmission unit 103 identifies an area in which the number of portable terminals 20 per unit area is equal to or greater than the first threshold (dense area). The candidate determination unit 103 performs the calculation using the position information of each of the portable terminals 20 acquired by the position information acquisition unit 102. In a case where a place to be surveilled is configured by a plurality of split areas, the upper limit which is uniform in all split areas may be previously held as the first threshold, in a predetermined storage area. In this case, the candidate determination unit 103 counts the number of portable terminals 20 in each of the split areas from the pieces of position information of the portable terminals 20 acquired by the position information acquisition unit 102 and compares each sum with the upper limit (first threshold) in the predetermined storage area. The candidate determination unit 103 identifies an area in which the number of portable terminals 20 is equal to or greater than the upper limit (dense area), based on the comparison result. Finally, the candidate determination unit 103 determines the candidate terminals from among the portable terminals 20 in the identified dense area. Alternatively, the candidate determination unit 103 may define in advance the upper limit of portable terminals 20 for each split area, and compare a sum of the portable terminals 20 in each split area with the upper limit defined for that area. For example, in a case where a certain place has accident-prone characteristics in comparison to other places due to the place being sloped or narrow, the upper limit of the area including this place may be set to be greater than that in other areas. Alternatively, the upper limit of an area may be changed in accordance with the situation in a case where the dangerousness of an area is changed by weather and the like, such as a sloped area which becomes slippery by rain. For example, the candidate determination unit 103 can adjust the upper limit value for an area having the dangerousness which is changed by the weather and the like, using a function configured to calculate the upper limit using the conditions of the weather, the temperature, the humidity, and the like, as parameters. In a case where a place to be surveilled is moved accompanying the progress of an event such as a marathon, the upper limit of each area may be changed in accordance with the movement. In this case, for example, a manager of the surveillance system predicts positions of participants and staff of the event in accordance with the progress of the event, and defines a function for calculating the upper limit of each area according to time in advance, based on this prediction. The candidate determination unit 103 can calculate the upper limit of each area according to time, from the predefined function by using time as a parameter. Alternatively, the area to be surveilled can be recognized in accordance with position information of guides of the event (in a case of a marathon, security guards or guides at the front and end of the runners). Thus, the candidate determination unit 103 may acquire position information of the guides of the event and control the upper limit corresponding to an area to be surveilled recognized from the acquired position information. The operation of the candidate determination unit 103 is not limited to the example described here.

The area information acquisition unit 101 in this example embodiment identifies a sparse area based on the position information of the portable terminals 20 acquired by the position information acquisition unit 102. The sparse area is an area in which the number of portable terminals 20 or the density of the portable terminals 20 is equal to or smaller than a predetermined second threshold. Then, the area information acquisition unit 101 sets the identified sparse area as the surveillance-desired area.

For example, the second threshold is obtained by the area information acquisition unit 101 by using a function defining a lower limit of the number of portable terminals 20 (the minimum number of portable terminals 20 required for surveillance) per unit area. The area information acquisition unit 101 calculates, for example, the number (density) of portable terminals 20 per unit area, each area having a predetermined size, and identifies an area in which the number of portable terminals 20 per unit area is equal to or smaller than the second threshold (sparse area) by using the position information of each of the portable terminals 20 acquired by the position information acquisition unit 102. In a case where a place to be surveilled is configured by a plurality of split areas, the lower limit which is uniform in all split areas may be previously held as the second threshold in a predetermined storage area. In this case, the area information acquisition unit 101 counts the number of portable terminals 20 for each of the split areas using the pieces of position information of the portable terminals 20 acquired by the position information acquisition unit 102 and compares each sum with the lower limit (second threshold) in the predetermined storage area. The area information acquisition unit 101 identifies an area in which the number of portable terminals 20 is equal to or smaller than the lower limit (sparse area), based on the comparison result. The area information acquisition unit 101 sets the sparse area identified here as the surveillance-desired area. Similar to a case of the upper limit, the lower limit may also be changed in accordance with factors such as different characteristics for each place, the weather, or the like, or in accordance with the situation of movement in the area to be surveilled. The operation of the area information acquisition unit 101 is not limited to the example described here.

[Hardware Configuration]

The center apparatus 10 in this example embodiment has a hardware configuration illustrated in FIG. 3. The processing units in this example embodiment are implemented in a manner similar to that in the first example embodiment.

Operation Example

Figure 5:
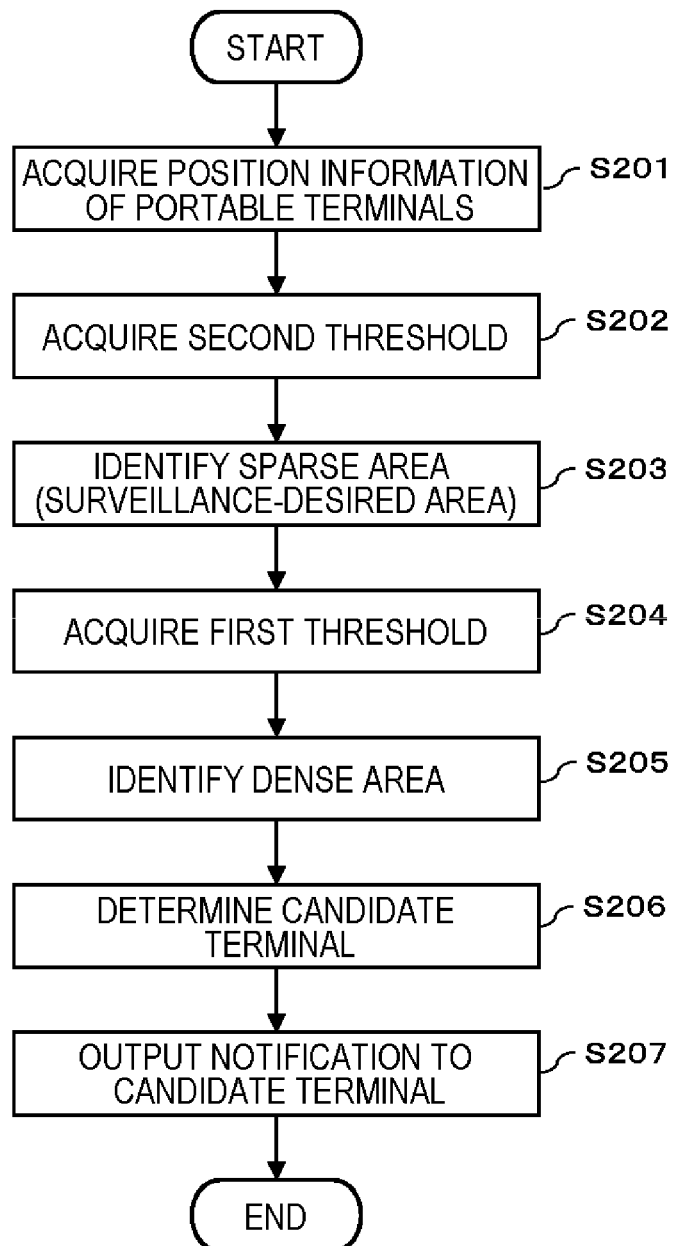
FIG. 5 is a flowchart illustrating a flow of processing of a surveillance system according to a second example embodiment.

An operation example of the surveillance system 1 in this example embodiment will be described with reference to FIG. 5. FIG. 5 is a flowchart illustrating a flow of processing of the surveillance system 1 in the second example embodiment. Here, an operation example in a case where the center apparatus 10 automatically discriminates the surveillance-desired area will be described.

First, the position information acquisition unit 102 acquires pieces of position information of portable terminals 20 (S201). The area information acquisition unit 101 acquires a second threshold for identifying a surveillance-desired area by using a previously-held function or the like (S202). The area information acquisition unit 101 identifies a sparse area in which the number of portable terminals 20 or a density of the portable terminals 20 is equal to or smaller than the second threshold as the surveillance-desired area, based on the pieces of position information acquired in S201 (S203). The candidate determination unit 103 acquires a first threshold for determining an area from which candidate terminals are selected, by using the function or the like held in advance (S204). The candidate determination unit 103 identifies a dense area in which the number of portable terminals 20 or a density of the portable terminals 20 is equal to or greater than the first threshold, based on the pieces of position information acquired in S201 (S205). The candidate determination unit 103 determines candidate terminals from portable terminals 20 present in the dense area identified in S205 (S206). The candidate determination unit 103 determines candidate terminals of the number input from the surveillance operator or the number calculated based on, for example, a difference in densities between the sparse area and the dense area. The candidate determination unit 103 may completely randomly determine candidate terminals or may determine the candidate terminals in an order from the closest portable terminal 20 to the surveillance-desired area. The notification unit 104 outputs a notification to the candidate terminals determined in S206, prompting to move to the surveillance-desired area identified in S203 (S207).

As described above, according to this example embodiment, it is possible to obtain the effect which is similar to that in the first example embodiment.

Third Example Embodiment

For example, unexpected situations such as accidents may highly possibly occur in a crowded place where people are concentrated. In a place where the flow of people is stagnant, there is high possibility that some kind of abnormality has occurred that is disturbing the flow. In a case where there are many people who are feeling dissatisfied, the possible occurrence of trouble is high. Therefore, it is preferable that the surveilling side enhances surveillance in such a place. In this example embodiment, an embodiment will be explained in which the center apparatus 10 performs processing based on such situations.

[Processing Configuration]

Figure 6:
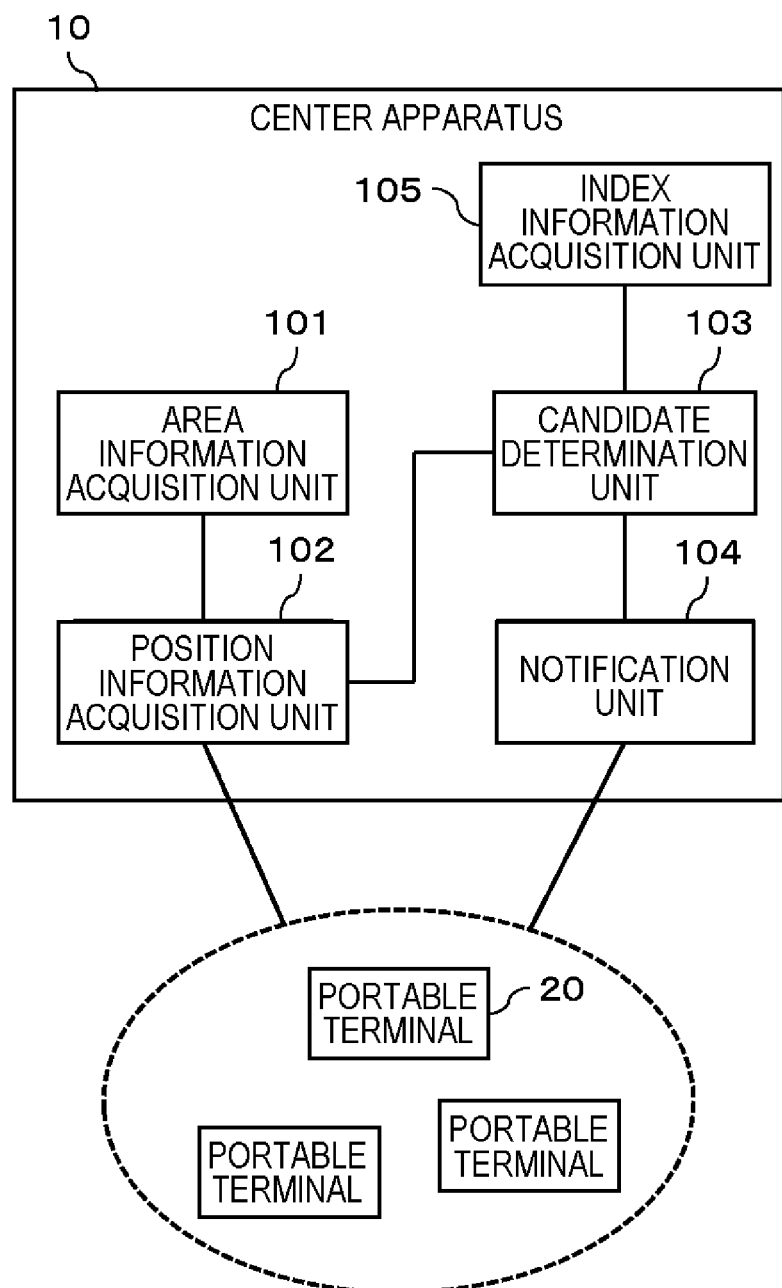
FIG. 6 is a diagram conceptually illustrating a system configuration of a surveillance system according to a third example embodiment.

FIG. 6 is a diagram conceptually illustrating a system configuration of a surveillance system 1 according to a third example embodiment. In this example embodiment, a center apparatus 10 further includes an index information acquisition unit 105 in addition to the configuration in the second example embodiment.

The index information acquisition unit 105 acquires index information as an indicator of the degree of necessity for surveillance such as, for example, the degree of congestion of people in the place to be surveilled, the stagnating degree of people in the place to be surveilled, and the degree of dissatisfaction of people in the place to be surveilled. The index information acquired by the index information acquisition unit 105 is not limited to the above examples.

The degree of congestion of people is calculated, for example, by analyzing images captured by a fixed-point surveillance camera or a portable terminal 20 of a security guard. The index information acquisition unit 105 may calculate the degree of congestion of people by acquiring and analyzing the images, or may acquire a result obtained by another device analyzing the degree of congestion of people using the images. The stagnating degree of people is calculated, for example, by analyzing images captured by a fixed-point surveillance camera or a portable terminal 20 of a security guard in time series. The index information acquisition unit 105 may calculate the stagnating degree of people by acquiring and analyzing the time-series images, or may acquire a result of analysis of the degree of congestion obtained by another device using the time-series images. The degree of dissatisfaction of a person is calculated, for example, by using a predetermined function for quantifying the degree of dissatisfaction based on the progress status of an on-going event (for example, the progress status of a sports competition), weather information (temperature, humidity, and the like), degree of congestion of persons, the stagnating degree of persons, and the like. The index information acquisition unit 105 may calculate the degree dissatisfaction based on the pieces of information, or may acquire a result of analysis of the degree of dissatisfaction obtained by another device based on the pieces of information as the index information.

The candidate determination unit 103 in this example embodiment changes the first threshold based on the index information acquired by the index information acquisition unit 105. For example, the candidate determination unit 103 holds a predetermined function for correcting the first threshold using the degree of congestion of people, the stagnating degree of persons, or the degree of dissatisfaction of people obtainable as index information, as an argument, and changes the first threshold by substituting the index information acquired by the index information acquisition unit 105 into the function. Specifically, the function is for correcting the first threshold to be increased as the degree of congestion of people, the stagnating degree of people, or the degree of dissatisfaction which is obtained by the index information becomes higher. The candidate determination unit 103 identifies an area in which the number of portable terminals 20 or a density of the portable terminals 20 is equal to or greater than the first threshold (dense area), based on the pieces of position information of the portable terminals 20 acquired by the position information acquisition unit 102. Then, the candidate determination unit 103 determines a candidate terminal from portable terminals 20 positioned in the dense area.

The area information acquisition unit 101 in this example embodiment changes the second threshold based on the index information acquired by the index information acquisition unit 105. For example, the candidate determination unit 103 holds a predetermined function for correcting the second threshold using the degree of congestion of people, the stagnating degree of people, or the degree of dissatisfaction which is obtained as the index information, as an argument, and changes the second threshold by substituting the index information acquired by the index information acquisition unit 105 into the function. The function is for correcting the second threshold to be increased as the degree of congestion of people, the stagnating degree of people, or the degree of dissatisfaction which is obtained by the index information becomes higher. The area information acquisition unit 101 identifies an area in which the number of portable terminals 20 or a density of the portable terminals 20 is equal to or smaller than the second threshold (sparse area), based on the pieces of position information of the portable terminals 20 acquired by the position information acquisition unit 102. Then, the area information acquisition unit 101 sets the identified sparse area as the surveillance-desired area.

[Hardware Configuration]

The center apparatus 10 in this example embodiment has a hardware configuration illustrated in FIG. 3. A storage 1003 stores a program for implementing the function of the area information acquisition unit 101 in this example embodiment, a program for implementing the function of the candidate determination unit 103 in this example embodiment, and a program for implementing the function of the index information acquisition unit 105 in this example embodiment. The area information acquisition unit 101 executes the programs so as to implement each of the functions of the area information acquisition unit 101, the candidate determination unit 103, and the index information acquisition unit 105 in this example embodiment.

Operation Example

Figure 7:
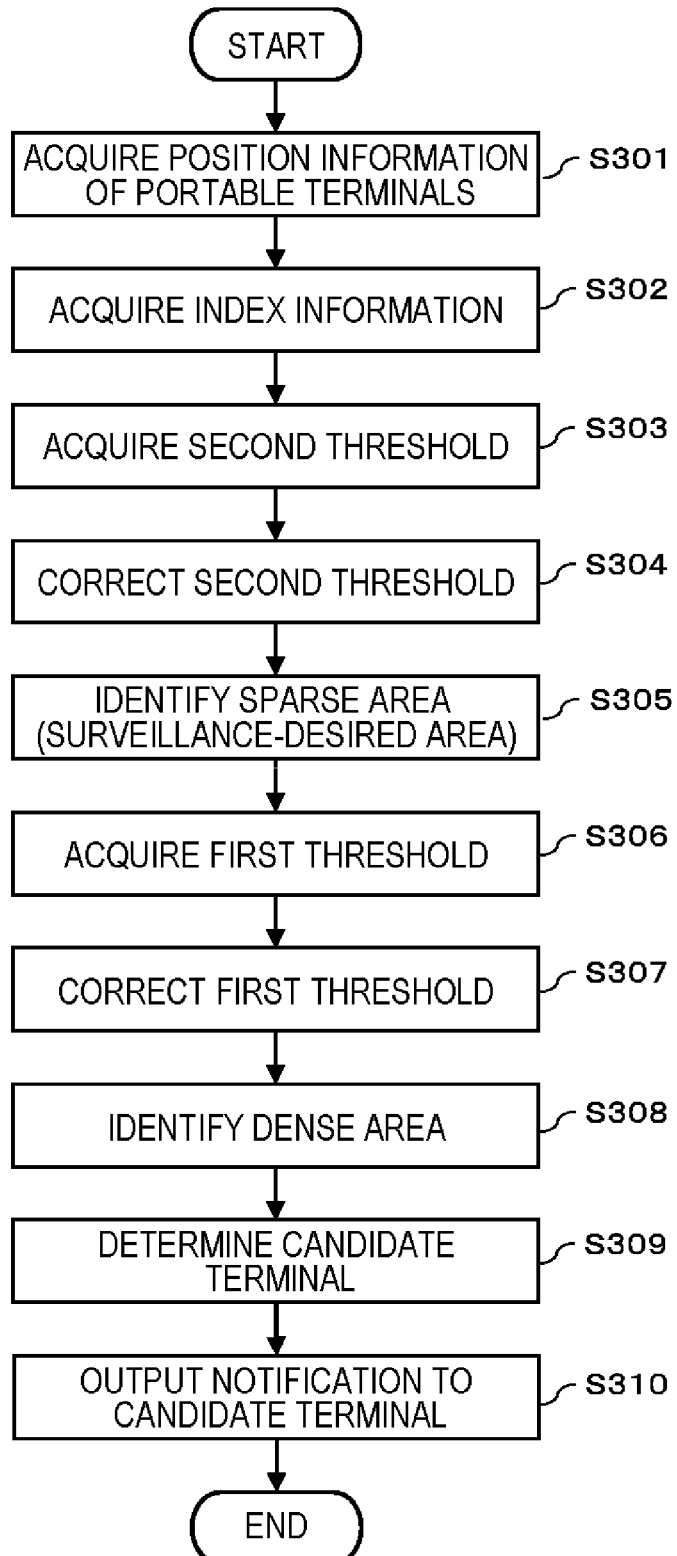
FIG. 7 is a flowchart illustrating a flow of processing of the surveillance system in the third example embodiment.

An operation example of the surveillance system 1 in this example embodiment will be described with reference to FIG. 7. FIG. 7 is a flowchart illustrating a flow of processing of the surveillance system 1 in the third example embodiment. Here, an operation example in a case where the center apparatus 10 automatically discriminates the surveillance-desired area will be described.

First, the position information acquisition unit 102 acquires position information of each of the portable terminals 20 (S301). Subsequently or in parallel, the index information acquisition unit 105 acquires index information (S302). As described in the second example embodiment, the area information acquisition unit 101 acquires the second threshold for identifying the surveillance-desired area (S303). The area information acquisition unit 101 corrects the second threshold acquired in S303, based on the index information acquired in S302 (S304). The area information acquisition unit 101 identifies a sparse area in which the number of portable terminals 20 or a density of the portable terminals 20 is equal to or smaller than the second threshold, as the surveillance-desired area, based on the pieces of position information acquired in S301 (S305). As described in the second example embodiment, the candidate determination unit 103 acquires the first threshold for identifying an area from which candidate terminals are selected (S306). The candidate determination unit 103 corrects the first threshold acquired in S306, based on the index information acquired in S302 (S307). The candidate determination unit 103 identifies a dense area in which the number of portable terminals 20 or a density of the portable terminals 20 is equal to or greater than the first threshold, based on the pieces of position information acquired in S301 (S308). The candidate determination unit 103 determines a candidate terminal from portable terminals 20 present in the dense area identified in S308 (S309). The notification unit 104 outputs a notification, to the candidate terminals determined in S309, prompting to move to the surveillance-desired area identified in S305 (S310). In this flowchart, an example in which the sparse area is identified and then the dense area is identified is described. However, it is not limited thereto, and the sparse area may be identified after the dense area is identified. In this case, after the candidate determination unit 103 corrects the first threshold, and then identifies the dense area, the area information acquisition unit 101 corrects the second threshold and determines the sparse area.

Advantageous Effect of Third Example Embodiment

As described above, in this example embodiment, the first threshold and the second threshold are corrected based on the index information of each area as an indicator of the degree of necessity for surveillance, such as the degree of congestion of people, the stagnating degree of people, and the degree of dissatisfaction. Thus, when the surveillance-desired area (that is, a poorly-surveilled area) and an area from which candidate terminals are selected (that is, an excessively-surveilled area) are determined in the second example embodiment, it is possible to improve the accuracy.

Fourth Example Embodiment

In the above-described example embodiments, a person performing surveillance work is not distinguished from an ordinary visitor of an event held in a place to be surveilled who expressed participation in surveillance work. However, a person expressing participation in surveillance work is merely visiting the event that is held, different from a person engaged in surveillance work. Since the person expressing participation in surveillance work does not act in an organized manner but acts on his/her own volition, the distribution of portable terminals 20 is hardly retained. This example embodiment explains a mechanism focusing on persons expressing participation in surveillance work.

In this example embodiment, a center apparatus 10 performs the above processing with portable terminals expressing participation in surveillance work as target terminals to be subjected to the processing. Specifically, a position information acquisition unit 102 in this example embodiment acquires position information of the portable terminals 20 expressing participation in surveillance work. Thereby, a candidate determination unit 103 in this example embodiment determines a candidate terminal to be moved to the surveillance-desired area, from the portable terminals 20 expressing participation in surveillance work. In a case where the center apparatus 10 automatically discriminates the surveillance-desired area, the area information acquisition unit 101 determines the surveillance-desired area based on the pieces of position information of the portable terminals 20 expressing participation in surveillance work.

[Processing Configuration]

Figure 8:
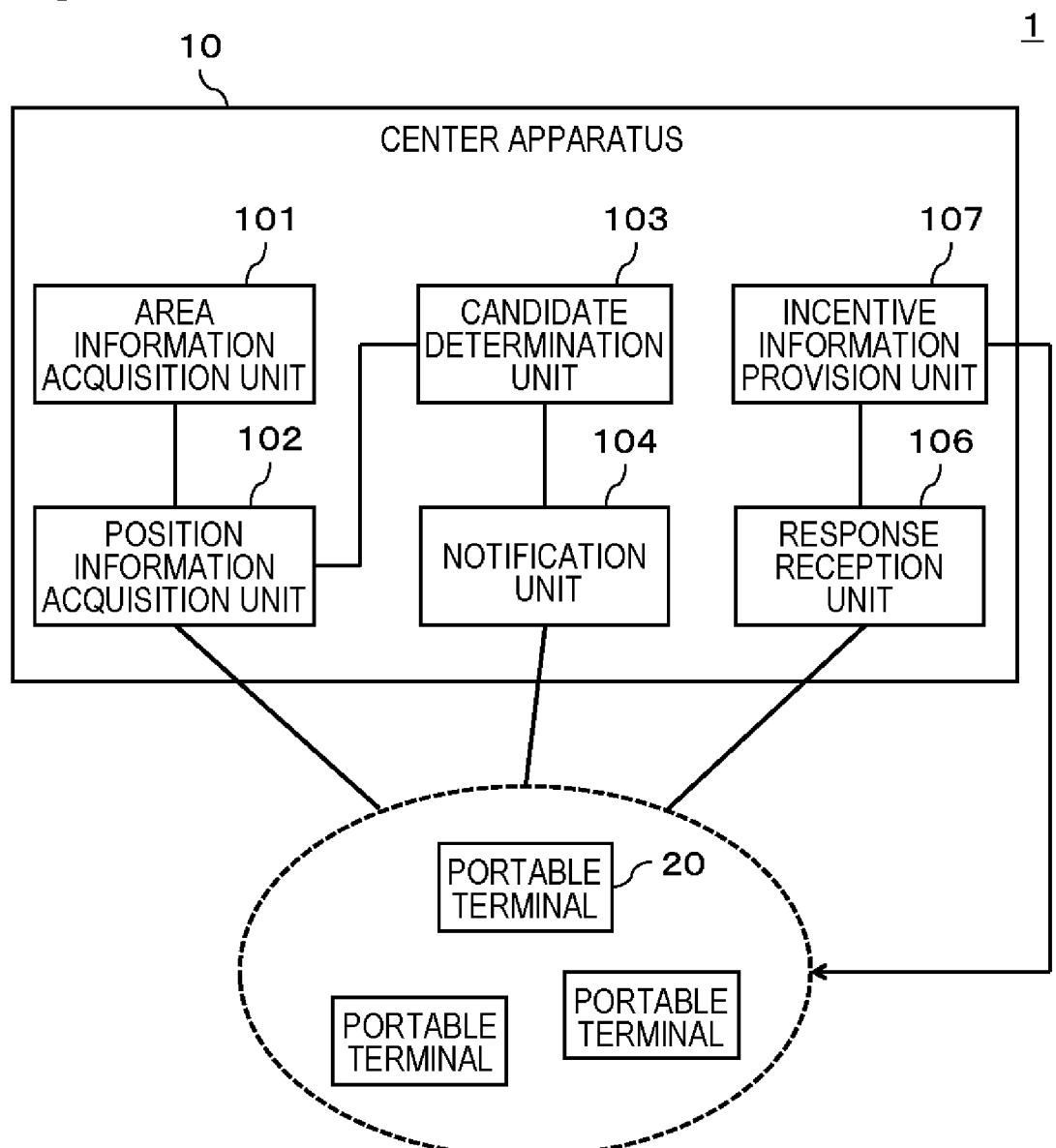
FIG. 8 is a diagram conceptually illustrating a system configuration of a surveillance system according to a fourth example embodiment.

FIG. 8 is a diagram conceptually illustrating a system configuration of a surveillance system 1 according to a fourth example embodiment. In this example embodiment, a center apparatus 10 further includes a response reception unit 106 and an incentive information provision unit 107, in addition to the above-described configuration of each of the example embodiments. FIG. 8 is illustrated based on the configuration of the center apparatus 10 in FIG. 1. However, the center apparatus 10 in this example embodiment may further include the index information acquisition unit 105 in FIG. 6.

The response reception unit 106 receives, from the candidate terminals, responses to the notification outputted by the notification unit 104 (response regarding whether or not moving to the surveillance-desired area is accepted).

The candidate determination unit 103 in this example embodiment calculates the number of portable terminals 20 to be moved to the surveillance-desired area. For example, in a case where the required number of portable terminals 20 per unit area is previously defined, the candidate determination unit 103 calculates a difference between the predefined number and the number of portable terminals 20 present per unit area as the number of portable terminals 20 to be moved to the surveillance-desired area. The number of portable terminals 20 present per unit area is calculated based on the number of portable terminals 20 in the surveillance-desired area and the area of the surveillance-desired area. For example, in a case where the place to be surveilled is configured by a plurality of split areas, and the minimum required number of terminals is set, which may be different according to the area or may be uniform in each of the split areas, the candidate determination unit 103 calculates a difference between the number of portable terminals 20 present in the surveillance-desired area and the minimum required number of terminals in the area selected as the surveillance-desired area as the number of portable terminals 20 to be moved to the surveillance-desired area. In a case where the center apparatus 10 further includes an index information acquisition unit 105, the candidate determination unit 103 may correct "the number of portable terminals 20 per unit area" or "the minimum required number of terminals" based on index information. Then, the candidate determination unit 103 may calculate the number of portable terminals 20 present in the surveillance-desired area.

The candidate determination unit 103 repeats determination of candidate portable terminals to be moved to the surveillance-desired area until the received number of responses accepting to move to the surveillance-desired area reaches the calculated number. Incidentally, there may be a case where the received number of responses accepting to move to the surveillance-desired area may not satisfy the required number even when all the portable terminals 20 as targets are determined as candidate terminals and notifications are outputted thereto. In such a case, the candidate determination unit 103 waits for a predetermined time to elapse (for example, several minutes to ten minutes or so), and then determines a candidate terminal again. Then, the notification unit 104 outputs the notification. If there is a user who was unable to move to the surveillance-desired area at the time of receiving the previous notification due to a certain reason but the reason is solved after time has elapsed, it is possible to expect to obtain a response accepting to move to the surveillance-desired area from the portable terminal 20 of that user.

The incentive information provision unit 107 provides incentive information to the candidates which have transmitted a response accepting to move to the surveillance-desired area. For example, the incentive information is benefit information for improving motivation of a user, such as a membership point or a coupon of a partner company.

[Hardware Configuration]

The center apparatus 10 in this example embodiment has a hardware configuration illustrated in FIG. 3. A storage 1003 stores a program for implementing the function of the candidate determination unit 103 in this example embodiment, a program for implementing the function of the response reception unit 106 in this example embodiment, and a program for implementing the function of the incentive information provision unit 107 in this example embodiment. The area information acquisition unit 101 executes the programs so as to implement each of the functions of the candidate determination unit 103, the response reception unit 106, and the incentive information provision unit 107 in this example embodiment.

Operation Example

Figure 9:
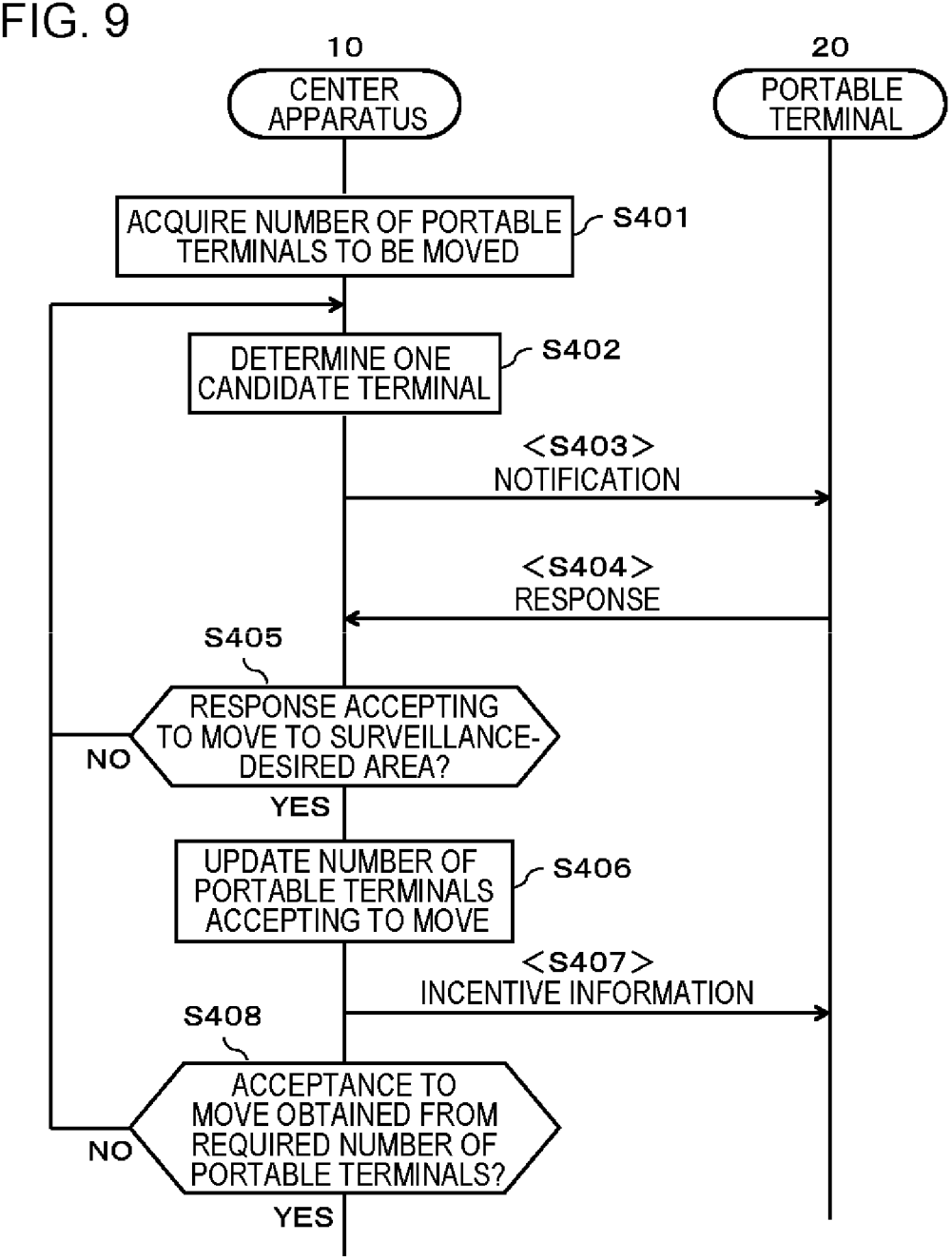
FIG. 9 is a sequence diagram illustrating a flow of processing of a surveillance system in a first operation example of the fourth example embodiment.

An operation example of the surveillance system 1 in this example embodiment will be described with reference to FIGS. 9 and 10. Here, a flow of processing after the candidate determination unit 103 determines a candidate terminal will be described.

First Operation Example

First, a first operation example in this example embodiment will be described with reference to FIG. 9. FIG. 9 is a sequence diagram illustrating a flow of processing of a surveillance system 1 in the first operation example of the fourth example embodiment.

As described above, the candidate determination unit 103 acquires the number of portable terminals to be moved to the surveillance-desired area (S401). Then, the candidate determination unit 103 determines one candidate terminal (S402) and the notification unit 104 outputs a notification prompting to move to the surveillance-desired area, to the determined candidate terminal (S403). A response to the notification in S403 is transmitted from the portable terminal 20, and the response reception unit 106 receives the response (S404). The candidate determination unit 103 determines whether or not the received response is a response accepting to move to the surveillance-desired area (S405). In a case where the response received in S404 is not the response accepting to move to the surveillance-desired area (NO in S405), the candidate determination unit 103 newly determines one candidate terminal (S402), and the above-described processes are repeated. On the other hand, in a case where the response received in S404 is the response accepting to move to the surveillance-desired area (YES in S405), the candidate determination unit 103 updates the number of portable terminals accepting to move, for example, by incrementing a counter indicating the number of portable terminals accepting to move (S406). The incentive information provision unit 107 provides incentive information to the portable terminal 20 which has transmitted a response accepting to move to the surveillance-desired area (S407). The candidate determination unit 103 determines whether or not acceptance has been obtained from the required number of portable terminals 20 (that is, the number acquired in S401) (S408). In a case where acceptance has not been obtained from the required number of portable terminals 20 (NO in S408), the candidate determination unit 103 newly determines one candidate terminal (S402), and the above-described processes are repeated. On the other hand, in a case where acceptance has been obtained from the required number of portable terminals 20 (YES in S408), there is no need for the candidate determination unit 103 to determine a new candidate terminal, and the processing is ended.

Second Operation Example

Next, a second operation example in this example embodiment will be described with reference to FIG. 10. FIG. 10 is a sequence diagram illustrating a flow of processing of a surveillance system 1 in the second operation example of the fourth example embodiment.

As described above, the candidate determination unit 103 acquires the number of portable terminals to be moved to the surveillance-desired area (S501). Then, the candidate determination unit 103 determines the candidate terminals of the number acquired in S501 in a batch (S502), and the notification unit 104 outputs notifications, in a batch, prompting to move to the surveillance-desired area to the determined candidate terminals (S503). A response to the notification in S503 is transmitted from each of the candidate terminals, which is received by the response reception unit 106 (S504).

The candidate determination unit 103 determines whether or not all of the candidate terminals have transmitted a response accepting to move to the surveillance-desired area, until the response is received from all of the candidate terminals or after waiting for a predetermined time to elapse (S505). In a case where the response accepting to move to the surveillance-desired area is not obtained from all of the candidate terminals (NO in S505), the candidate determination unit 103 determines new candidate terminals in a batch (S502), and the above-described processes are repeated. Here, in a case where the response accepting to move to the surveillance-desired area is received from some of the candidate terminals, the candidate determination unit 103 determines new candidate terminals of a number equal to a value obtained by subtracting the number of terminals which have transmitted responses accepting to move to the surveillance-desired area, from the number acquired in S501. On the other hand, in a case where the response accepting to move to the surveillance-desired area is received from all of the candidate terminals (YES in S505), the incentive information provision unit 107 transmits incentive information to the portable terminals 20 which have transmitted a response accepting to move to the surveillance-desired area (S506).

Advantageous Effect of Fourth Example Embodiment

As described above, according to this example embodiment, new candidate terminals are determined until the number of times of the response reception unit 106 receiving the response from candidate terminals accepting to move to the surveillance-desired area reaches the number calculated by the candidate determination unit 103. Thus, it is possible to perform control to move a desired number of portable terminals 20 to the surveillance-desired area. In addition, it is possible to prevent an occurrence of a situation in which too many portable terminals 20 are moved to the surveillance-desired area. As a result, it is possible to prevent a poorly-surveilled area from being formed also in areas other than the surveillance-desired area.

In this example embodiment, incentive information is provided to the portable terminal 20 which has transmitted a response accepting to move to the surveillance-desired area. Accordingly, it is possible to enhance motivation of a user of a portable terminal 20 (that is, a general person) expressing participation in surveillance work to move in accordance with a notification from the center apparatus 10.

Hitherto, the example embodiments of the present invention are described with reference to the drawings. However, the example embodiments are just examples of the present invention, and various configurations other than the above example embodiments can be employed.

A plurality of processes are described in order in the plurality of flowcharts or the plurality of sequence diagrams which are used in the above descriptions. However, the turn of performing a process, which is applied to each of the example embodiments is not limited to the turn described therein. In each of the example embodiments, the order of the illustrated processes can be changed in a range without hindrance in contents. The above-described example embodiments can be combined in a range in which the contents do not conflict with each other.

Examples of reference forms are noted below.

1. A surveillance system including:

an area information acquisition unit that acquires information of a surveillance-desired area;

a position information acquisition unit that acquires pieces of position information of a plurality of portable terminals, each terminal performing surveillance using an image capturing unit;

a candidate determination unit that determines a candidate portable terminal to be moved to the surveillance-desired area from among the plurality of portable terminals based on the acquired pieces of position information of the plurality of portable terminals; and a notification output unit that outputs a notification to the candidate portable terminal requesting to move to the surveillance-desired area.

2. The surveillance system according to 1, wherein the position information acquisition unit acquires position information of a portable terminal expressing participation in surveillance from among the plurality of portable terminals.

3. The surveillance system according to 1 or 2, wherein the candidate determination unit identifies a dense area in which the number of the portable terminals or a density of the portable terminals is equal to or greater than a first threshold based on the position information of the portable terminals, and determines a candidate portable terminal to be moved to the surveillance-desired area from among the portable terminals present in the identified dense area.

4. The surveillance system according to 3, further including:

an index information acquisition unit that acquires index information as an indicator of a degree of necessity for surveillance, wherein the candidate determination unit changes the first threshold based on the acquired index information.

5. The surveillance system according to any one of 1 to 4, wherein the area information acquisition unit identifies a sparse area in which the number of the portable terminals or a density of the portable terminals is equal to or smaller than a second threshold based on the position information of the portable terminals, and sets the identified sparse area as a surveillance-desired area.

6. The surveillance system according to 5, further including:

an index information acquisition unit that acquires index information as an indicator of a degree of necessity for surveillance, wherein the area information acquisition unit changes the second threshold based on the acquired index information.

7. The surveillance system according to any one of 1 to 6, further including:

a response reception unit that receives a response to the notification from the candidate portable terminal, wherein the candidate determination unit calculates the number of portable terminals to be moved to the surveillance-desired area, and repeats determination of the candidate portable terminal to be moved to the surveillance-desired area until the received number of responses accepting to move to the surveillance-desired area reaches the calculated number.

8. The surveillance system according to 7, further including:
an incentive information provision unit that provides incentive information to the candidate portable terminal which has transmitted the response accepting to move to the surveillance-desired area.

9. A surveillance method performed by a computer, the method including:
acquiring information of a surveillance-desired area;
acquiring pieces of position information of a plurality of portable terminals, each portable terminal performing surveillance using an image capturing unit;
determining a candidate portable terminal to be moved to the surveillance-desired area from among the plurality of portable terminals based on the acquired pieces of position information of the plurality of portable terminals; and
outputting a notification to the candidate portable terminal requesting to move to the surveillance-desired area.

10. The surveillance method performed by the computer according to 9, the method further including:
acquiring position information of a portable terminal expressing participation in surveillance from among the plurality of portable terminals.

11. The surveillance method performed by the computer according to 9 or 10, the method further including:
identifying a dense area in which the number of the portable terminals or a density of the portable terminals is equal to or greater than a first threshold based on the position information of the portable terminals, and
determining a candidate portable terminal to be moved to the surveillance-desired area from among portable terminals present in the identified dense area.

12. The surveillance method performed by the computer according to 11, the method further including:
acquiring index information as an indicator of a degree of necessity for surveillance, and changing the first threshold based on the acquired index information.

13. The surveillance method performed by the computer according to any one of 9 to 12, the method further including:
identifying a sparse area in which the number of the portable terminals or a density of the portable terminals is equal to or smaller than a second threshold based on the position information of the portable terminal, and
setting the identified sparse area as a surveillance-desired area.

14. The surveillance method performed by the computer according to 13, the method further including:
acquiring index information as an indicator of a degree of necessity for surveillance, and
changing the second threshold based on the acquired index information.

15. The surveillance method performed by the computer according to any one of 9 to 14, the method further including:
receiving a response to the notification from the candidate portable terminal,
calculating the number of portable terminals to be moved to the surveillance-desired area, and
repeating the step of determining a candidate portable terminal to be moved to the surveillance-desired area until the received number of responses accepting to move to the surveillance-desired area reaches the calculated number.

16. The surveillance method performed by the computer according to 15, the method further including:
providing incentive information to the candidate portable terminal which has transmitted the response accepting to move to the surveillance-desired area.

17. A program causing a computer to function as:
an area information acquisition unit that acquires information of a surveillance-desired area;
a position information acquisition unit that acquires pieces of position information of a plurality of portable terminals, each portable terminal performing surveillance using an image capturing unit;
a candidate determination unit that determines a candidate portable terminal to be moved to the surveillance-desired area from among the plurality of portable terminals based on the acquired pieces of position information of the plurality of portable terminals; and
a notification output unit that outputs a notification to the candidate portable terminal requesting to move to the surveillance-desired area.

18. The program according to 17, further causing the computer to function as:
the position information acquisition unit that acquires position information of a portable terminal expressing participation in surveillance from among the plurality of portable terminals.

19. The program according to 17 or 18, further causing the computer to function as:
the candidate determination unit that
identifies a dense area in which the number of the portable terminals or a density of the portable terminals is equal to or greater than a first threshold based on the acquired position information of the portable terminals, and
determines a candidate portable terminal to be moved to the surveillance-desired area from among the portable terminals present in the identified dense area.

20. The program according to 19, further causing the computer to function as:
an index information acquisition unit that acquires index information as an indicator of a degree of necessity for surveillance, and
the candidate determination unit that changes the first threshold based on the acquired index information.

21. The program according to any one of 17 to 20, further causing the computer to function as:
the area information acquisition unit that identifies a sparse area in which the number of the portable terminals or a density of the portable terminals is equal to or smaller than a second threshold based on the position information of the portable terminal and sets the identified sparse area as a surveillance-desired area.

22. The program according to 21, further causing the computer to function as:
an index information acquisition unit that acquires index information as an indicator of a degree of necessity for surveillance, and
the area information acquisition unit that changes the second threshold based on the acquired index information.

23. The program according to any one of 17 to 22, further causing the computer to function as:
a response reception unit that receives a response to the notification from the candidate portable terminal, and
the candidate determination unit that calculates the number of portable terminals to be moved to the surveillance-desired area, and repeats the determination of the candidate portable terminal to be moved to the surveillance-desired area until the received number of responses accepting to move to the surveillance-desired area reaches the calculated number.

24. The program according to 23, further causing the computer to function as:
an incentive information provision unit that provides incentive information to the candidate portable terminal which has transmitted the response accepting to move to the surveillance-desired area.

The invention claimed is:
1. An event surveillance system for surveillance of an event venue, comprising:
at least one memory storing instructions; and
at least one processor coupled to the at least one memory and configured to execute the instructions to:
receive, from each portable terminal of a plurality of portable terminals, position information indicating a position of the portable terminal; and
determine the surveillance-desired area being designated based on the displayed positions of the plurality of portable terminals using a threshold for a number of portable terminals; and
output a notification to at least one portable terminal that is not in the surveillance-desired area, the notification indicating a request to move to the surveillance-desired area,
wherein the processor is further configured to calculate the threshold from a predefined function by using time as a parameter.

2. The event surveillance system according to claim 1, wherein the processor is further configured to:
determine at least one candidate portable terminal to be moved to the surveillance-desired area from among the plurality of portable terminals that are not in the surveillance-desired area based on the position information of the plurality of portable terminals; and
output the notification to the at least one candidate portable terminal.

3. The event surveillance system according to claim 2, wherein the processor is further configured to:
identify a dense area in which a number of portable terminals, among the plurality of portable terminals, or a density of portable terminals, among the plurality of portable terminals, is equal to or greater than a threshold, based on the position information of the plurality of portable terminals; and
determine the at least one candidate portable terminal to be moved to the surveillance-desired area from among the portable terminals present in the identified dense area.

4. The event surveillance system according to claim 3, wherein the processor is further configured to:
acquire index information serving as an indicator of degree of necessity for surveillance; and
change the threshold based on the acquired index information.

5. An event surveillance method for surveillance of an event venue, comprising:
receiving, from each portable terminal of a plurality of portable terminals, position information indicating a position of the portable terminal; and
determining, the surveillance-desired area being designated based on the displayed positions of the plurality of portable terminals using a threshold for a number of portable terminal; and
outputting a notification to at least one portable terminal that is not in the surveillance-desired area, the notification indicating a request to move to the surveillance-desired area,
wherein the method further comprises calculating the threshold from a predefined function by using time as a parameter.

6. The event surveillance method according to claim 5, further comprising:
determining at least one candidate portable terminal to be moved to the surveillance-desired area from among the plurality of portable terminals that are not in the surveillance-desired area based on the acquired position information of the plurality of portable terminals; and
outputting the notification to the at least one candidate portable terminal.

7. The event surveillance method according to claim 6, further comprising:
identifying a dense area in which a number of portable terminals, among the plurality of portable terminals, or a density of portable terminals, among the plurality of portable terminals, is equal to or greater than a threshold, based on the position information of the plurality of portable terminals; and
determining the at least one candidate portable terminal to be moved to the surveillance-desired area from among the portable terminals present in the identified dense area.

8. The event surveillance method according to claim 7, further comprising:
acquiring index information serving as an indicator of degree of necessity for surveillance; and
changing the threshold based on the acquired index information.

9. A non-transitory computer-readable storage medium storing a program that causes a computer to perform an event surveillance method for surveillance of an event venue, the event surveillance method comprising:
receiving, from each portable terminal of a plurality of portable terminals, position information indicating a position of the portable terminal; and
determining the surveillance-desired area being designated based on the displayed positions of the plurality of portable terminals using a threshold for a number of portable terminals; and
outputting a notification to at least one portable terminal that is not in the surveillance-desired area, the notification indicating a request to move to the surveillance-desired area,
wherein the method further comprises calculating the threshold from a predetermined function by using time as a parameter.

10. The storage medium according to claim 9, wherein the event surveillance method further comprises:
determining at least one candidate portable terminal to be moved to the surveillance-desired area from among the plurality of portable terminals that are not in the surveillance-desired area based on the acquired position information of the plurality of portable terminals; and
outputting the notification to the at least one candidate portable terminal.

11. The storage medium according to claim 10, wherein the event surveillance method further comprises:
identifying a dense area in which a number of portable terminals, among the plurality of portable terminals or a density of portable terminals, among the plurality of portable terminals, is equal to or greater than a threshold, based on the position information of the plurality of portable terminals; and determining the at least one candidate portable terminal to be moved to the surveillance-desired area from among the portable terminals present in the identified dense area.

12. The storage medium according to claim 11, wherein the event surveillance method further comprises:
acquiring index information serving as an indicator of degree of necessity for surveillance; and
changing the threshold based on the acquired index information.

* * * * *